(12) United States Patent
Aizawa

(10) Patent No.: US 6,512,449 B1
(45) Date of Patent: Jan. 28, 2003

(54) SCREEN DISPLAY METHOD FOR PORTABLE INFORMATION TERMINAL

(75) Inventor: Masatoshi Aizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/216,964

(22) Filed: Dec. 21, 1998

(30) Foreign Application Priority Data

Dec. 22, 1997 (JP) .............................................. 9-352516

(51) Int. Cl.⁷ ................................................ H04Q 1/00
(52) U.S. Cl. ........................ 340/7.55; 340/7.51; 345/184
(58) Field of Search ........................ 340/825.44, 825.47, 340/7.2, 7.51, 47, 7.52, 7.55, 56; 345/184, 471, 352, 684, 125, 864, 2.3; 700/1, 7, 102, 500

(56) References Cited

U.S. PATENT DOCUMENTS 5,479,408 A    12/1995  Will .......................... 370/313
5,757,279 A *  5/1998  Fujiwara ................. 340/825.44
5,825,353 A * 10/1998  Will ........................... 345/184

* cited by examiner

Primary Examiner—Michael Horabik
Assistant Examiner—William Bangachon
(74) Attorney, Agent, or Firm—Jay H. Maioli

(57) ABSTRACT

A portable radio information terminal capable of operating at a plurality of phases to execute different functions. The terminal has a transition-request-input detecting section that detects an input signal generated by an input device in the course of an operation carried out within any current phase of the same plurality of phases to request an inter-phase transition, an inter-phase transition section that suspends the operation carried out at the current phase and executes a transition from the current phase to another phase determined by a result of detection output by the transition-request-input detecting section, and a phase-processing executing section for calling and displaying a screen of the phase transitioned to.

5 Claims, 11 Drawing Sheets

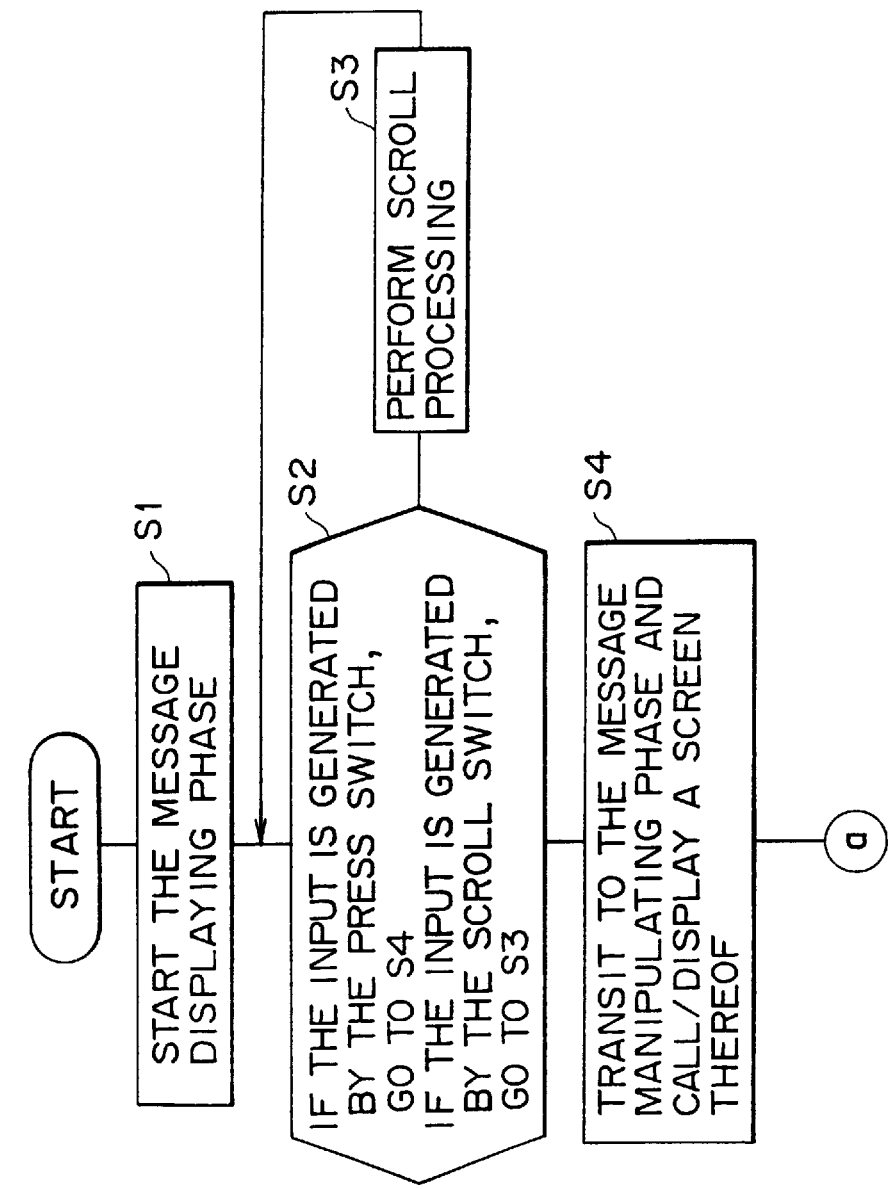

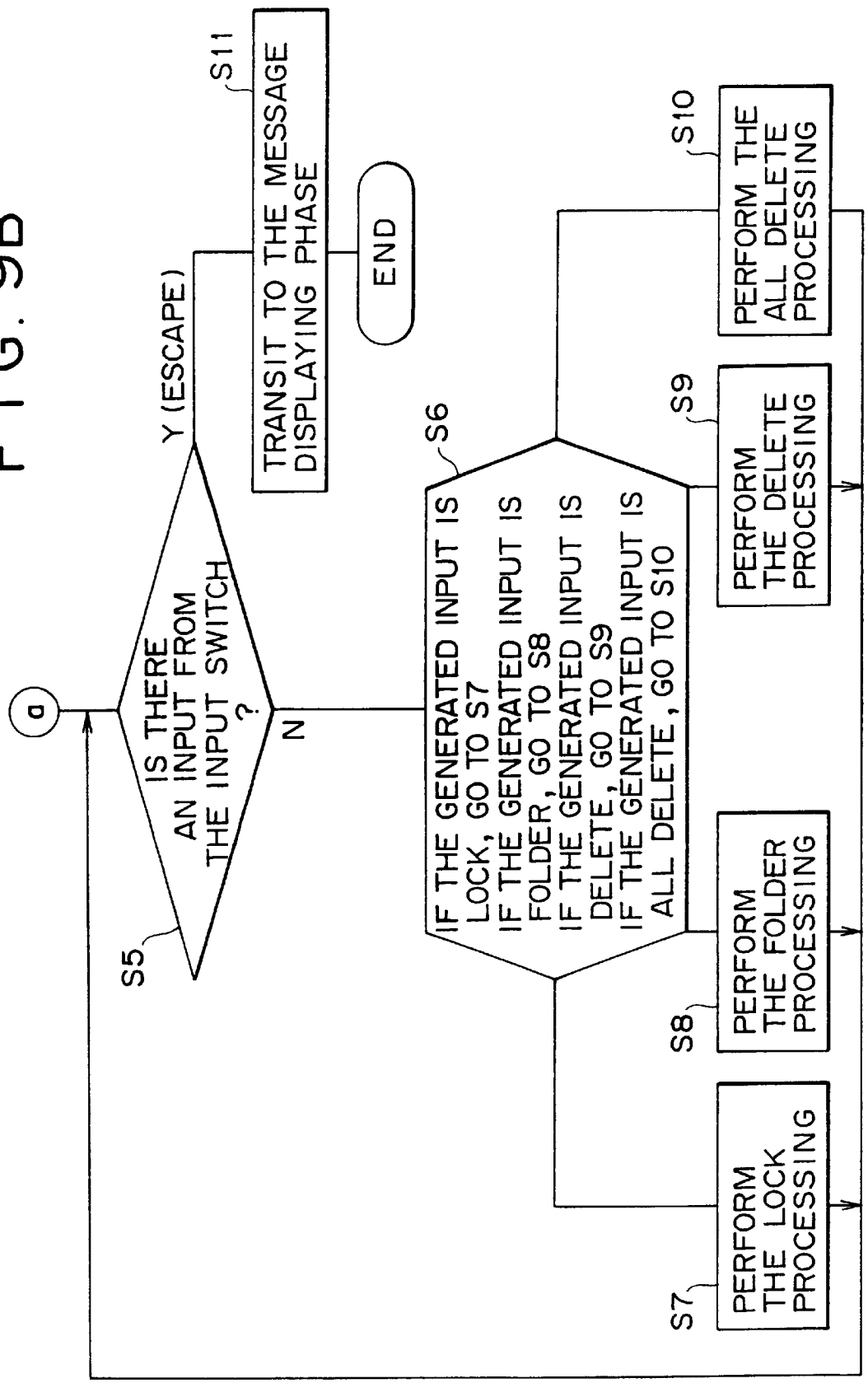

SCREEN DISPLAY METHOD FOR PORTABLE INFORMATION TERMINAL

BACKGROUND OF THE INVENTION

1. Field of the Invention

In general, the present invention relates to a portable radio information terminal and a screen calling method. More particularly, the present invention relates to a portable radio information terminal for displaying a message received and stored in a memory on an embedded screen display unit and, in particular, relates to a pager and a screen calling method adopted in the pager.

2. Description of the Prior Art

A portable radio information terminal is a handy and portable apparatus that is capable of functioning as a terminal of a communication network. In recent years, there have been implemented portable radio information terminals with a variety of configurations and functions to meet a rapidly growing demand in a wide range of applications in the field of information communication.

An example of such a portable radio information terminal is a pager which is widely used for carrying out communications of radio signals.

An early pager generates bell sound when a calling signal is received from a radio base station. A radio calling signal is capable of calling the user carrying this pager even if the user is present at a separated place. The radio calling signal is normally used to urge the user to respond to the calling signal by using a wire telephone closest to the user.

A signal generated by the radio base station is not merely ended with such a calling signal. A signal generated by the radio base station is also capable of conveying information. On the pager side, on the other hand, information conveyed by an incoming signal is decoded and a result of the decoding is stored in a memory unit and displayed on a liquid-crystal display panel as a message. A pager having functions to decode, store and display such information has been developed and widely used at the present time.

Such a pager is designed to be capable of operating in a plurality of states each referred to hereafter as a phase for different functions. The states include a message storing phase of organizing message texts each conveyed by an incoming signal into message files stored in a memory unit, a message displaying phase of displaying a message text stored in a message file on a screen and a message manipulating phase of manipulating a stored message file.

Some of the phases are executed only when requested by the user. A phase that waits for the user to enter a command displays a screen requesting the user to enter a command.

In the case of the message manipulating phase of manipulating a stored message file, for example, a message manipulating screen is displayed. The message manipulating screen informs the user that an operation can be carried out on a message text. For example, the user is capable of making a request for a lock operation to prevent a message text from being deleted or a delete operation to erase an unnecessary message text.

The message displaying phase for displaying a message text on a screen is provided with a message displaying screen. Displayed on a liquid-crystal display panel embedded in the pager, the message displaying screen is capable of showing a message text composed of up to typically 4 lines each comprising a maximum of typically 20 characters.

In the case of a message text composed of a number of lines, the user is capable of carrying out an operation to scroll up or down the message text, allowing all the lines to be displayed sequentially.

In the conventional pager, a message manipulating screen appears as a subsequent screen after the end of a message text. That is to say, a transition from a message displaying screen for displaying a message text stored in the memory unit to a message manipulating screen takes place automatically following the end of a message text.

In a configuration wherein a message manipulating screen is displayed automatically following the end of a message text as a screen subsequent to a message displaying screen as described above, it is necessary for the user to carry out a scroll operation repeatedly several times until the end of a currently displayed message text is reached.

As a result, if the message text is long or if processing of a message file containing the message text is required while the user is looking at a middle of the this message text, the operation to be carried out by the user becomes complicated, that is, it is necessary for the user to carry out a scroll-up operation repeatedly several times until the end of a currently displayed message text is reached for example, resulting in poor operatability.

SUMMARY OF THE INVENTION

It is thus an object of the present invention addressing the problem of calling a message manipulating screen encountered in the conventional portable radio information terminal as described above to provide a new portable radio information terminal which is capable of changing from a certain phase to another phase immediately in the course of processing at the certain phase in response to an operation carried out by the user and to provide a screen displaying method for the new portable radio information terminal.

According to a first aspect of the present invention, there is provided a screen displaying method for a portable radio information terminal which is provided with an image displaying unit capable of storing an incoming message in a message file, fetching the stored message from the message file and displaying at least the fetched message on a screen and provided with an input device capable of at least inputting a command for controlling an operation and capable of operating at a plurality of phases to execute functions different from each other. With the screen displaying method, when an input command is generated by the input device in the course of an operation carried out at an arbitrarily determined first phase of the same plurality of phases, the operation carried out at the first phase is suspended, a transition from the first phase to a second phase determined arbitrarily in advance among the same plurality of phases is executed and a screen of the second phase is called and displayed.

Thus, by merely carrying out a simple input operation, it is possible to execute a sequence of steps of: causing the input device to generate an input command in the course of an operation carried out at an arbitrarily determined first phase; suspending the operation carried out at the first phase; making a transition from the first phase to a second phase determined arbitrarily in advance right away; and calling and displaying a screen of the second phase right away.

As a result, it is no longer necessary to carry out a complicated operation such as execution of a scroll operation several times as is the case with the conventional portable radio information terminal and, hence, there is provided an effect of improved operatability.

According to a second aspect of the present invention, there is provided a portable radio information terminal provided with an image displaying unit capable of storing an incoming message in a message file, fetching the stored message from the message file and displaying at least the fetched message on a screen and provided with an input device capable of at least inputting a command for controlling an operation and capable of operating at a plurality of phases to execute functions different from each other. The portable radio information terminal at least has the following three means: a transition-request-input detecting means for detecting an input signal generated by the input device in the course of an operation carried out at any current phase of the same plurality of phases to request an inter-phase transition; an inter-phase transition means for suspending the operation carried out at the current phase and for executing an inter-phase transition from the current phase to another phase determined by a result of detection output by the transition-request-input detecting means; and a phase-processing executing means for at least calling and displaying a screen of the other phase to which the inter-phase transition has been executed by the inter-phase transition means on the image displaying unit.

Thus, by using the transition-request-input detecting means, the inter-phase transition means and the phase-processing executing means, it is possible to provide a portable radio information terminal capable of executing a sequence including the steps including the detecting an input signal requesting an inter-phase transition; executing an inter-phase transition from a current phase to another phase determined by a result of detection the input signal; and at least calling and displaying a screen of the other phase.

According to a third aspect of the present invention, there is provided a recording medium used for storing programs fetchable and executable by a computer employed in a portable radio information terminal which is also provided with an image displaying unit and an input device and is capable of operating at a plurality of phases wherein the programs at least include the following three means: a transition-request-input detecting means for detecting an input signal generated by the input device in the course of an operation carried out at any current phase of the same plurality of phases to request an inter-phase transition; an inter-phase transition means for suspending the operation carried out at the current phase and for executing an inter-phase transition from the current phase to another phase determined by a result of detection output by the transition-request-input detecting means; and a phase-processing executing means for at least calling and displaying a screen of the other phase to which the inter-phase transition has been executed by the inter-phase transition means on the image displaying unit.

Thus, by incorporating the recording medium in a portable radio information terminal comprising at least a central processing unit, an image displaying unit, an input device and a memory unit for storing messages and for storing the three means each as an operating procedure executable by the central processing unit and by letting the central processing unit sequentially execute the means each as an operating procedure, it is possible to provide the portable radio information terminal with functions of: detecting an input signal requesting an inter-phase transition; executing an inter-phase transition from a current phase to another phase determined by a result of detection of the input signal; and at least calling and displaying a screen of the other phase.

According to a fourth aspect of the present invention, there is provided an information processing apparatus which includes: an embedded central processing unit; an embedded storage unit for storing programs that can be fetched for execution by the central processing unit. The programs stored in the storage unit at least include the following three means: a transition-request-input detecting means for detecting an input signal generated by the input device in the course of an operation carried out at any current phase of a plurality of phases to request an inter-phase transition; an inter-phase transition means for suspending the operation carried out at the current phase and: for executing an inter-phase transition from the current phase to another phase determined by a result of detection output by the transition-request-input detecting means; and a phase-processing executing means for at least calling and displaying a screen of the other phase to which the inter-phase transition has been executed by the inter-phase transition means on the image displaying unit.

Thus, by incorporating the information processing apparatus in a portable radio information terminal along with components such as a communication mechanism unit, a memory unit for storing received messages, an input device, an image displaying unit for displaying information such as a message and a power-supply circuit, it is possible to implement a portable radio information terminal with a simple configuration for executing functions of: detecting an input signal requesting an inter-phase transition; executing an inter-phase transition from a current phase to another phase determined by a result of detection of the input signal; and at least calling and displaying a screen of the other phase.

BRIEF DESCRIPTION OF THE DRAWINGS

FIG. 9 shows a flowchart representing the phase transitions taking place in the portable radio information terminal implemented by the first embodiment of the present invention and operations to call and display a screen;

DETAILED DESCRIPTION OF THE PREFERRED EMBODIMENTS

The present invention will become more apparent from the following detailed description of some preferred embodiments with reference to the accompanying diagrams.

It should be noted that the embodiment described below is no more than a preferred example showing the essential configuration and operation of the present invention. Thus, the embodiment may have limitations which are desirable from the technological-configuration point of view. However, the scope of the present invention is not limited to the embodiment unless otherwise specified explicitly in a description to limit the scope of the present invention.

Figure 1:
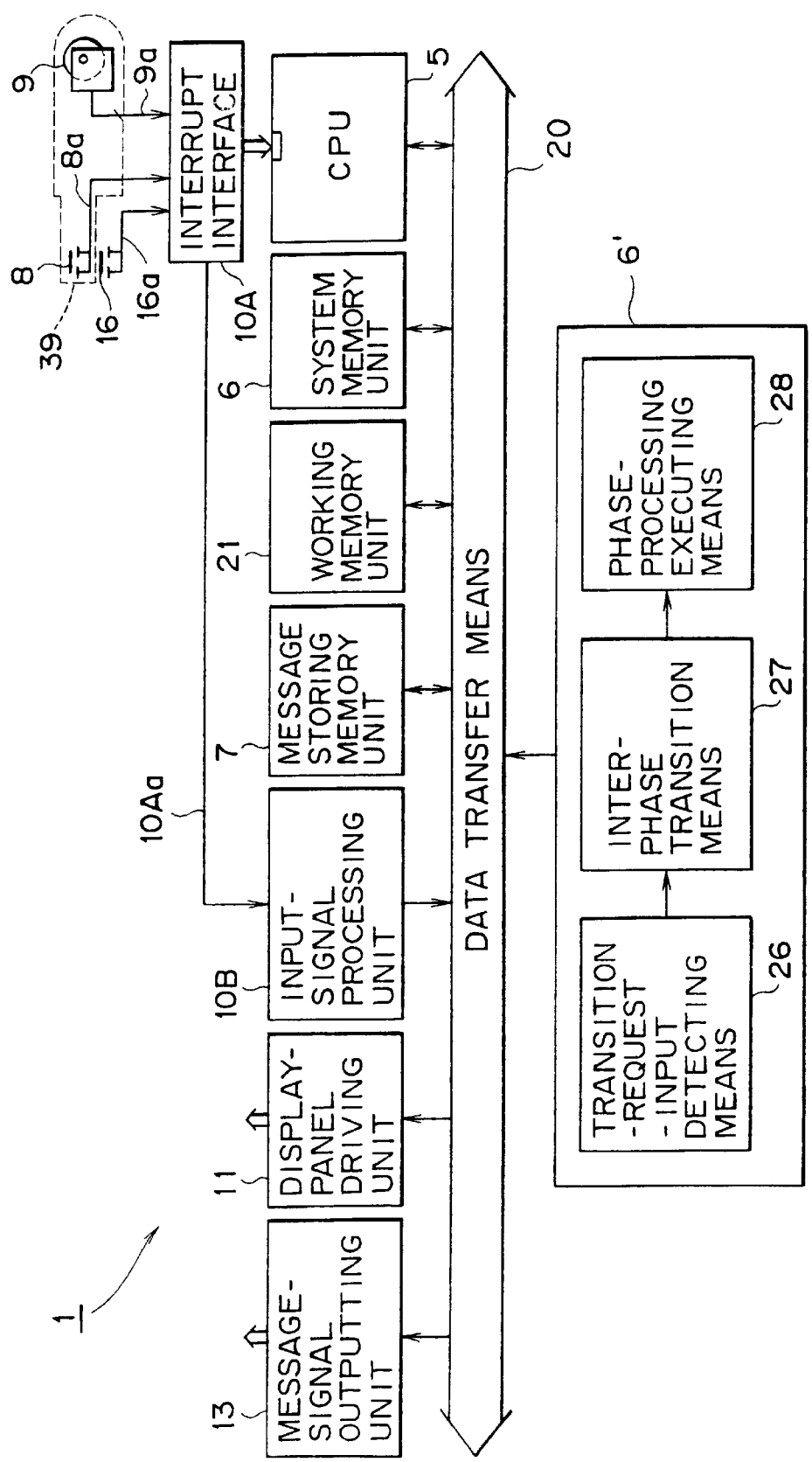
FIG. 1 is a block diagram showing the configuration of main components of a portable radio information terminal implemented by a first embodiment of the present invention.
Figure 2:
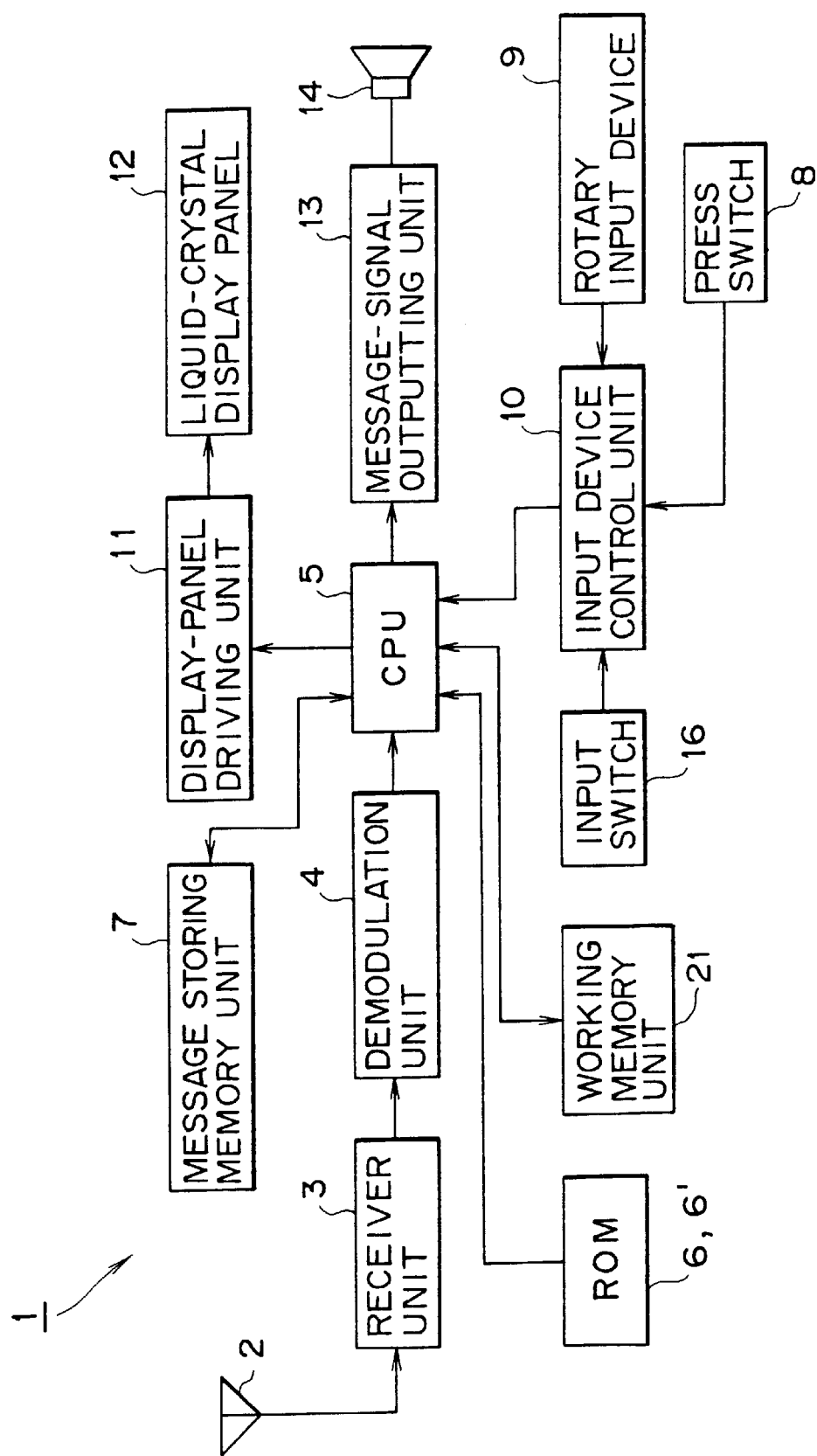
FIG. 2 is a block diagram showing a complete configuration of the portable radio information terminal shown in FIG. 1.

FIG. 1 is a block diagram showing the configuration of main components composing a portable radio information terminal implemented by a first embodiment of the present invention. FIG. 2 is a block diagram showing a complete configuration of the portable radio information terminal.

Figure 5:
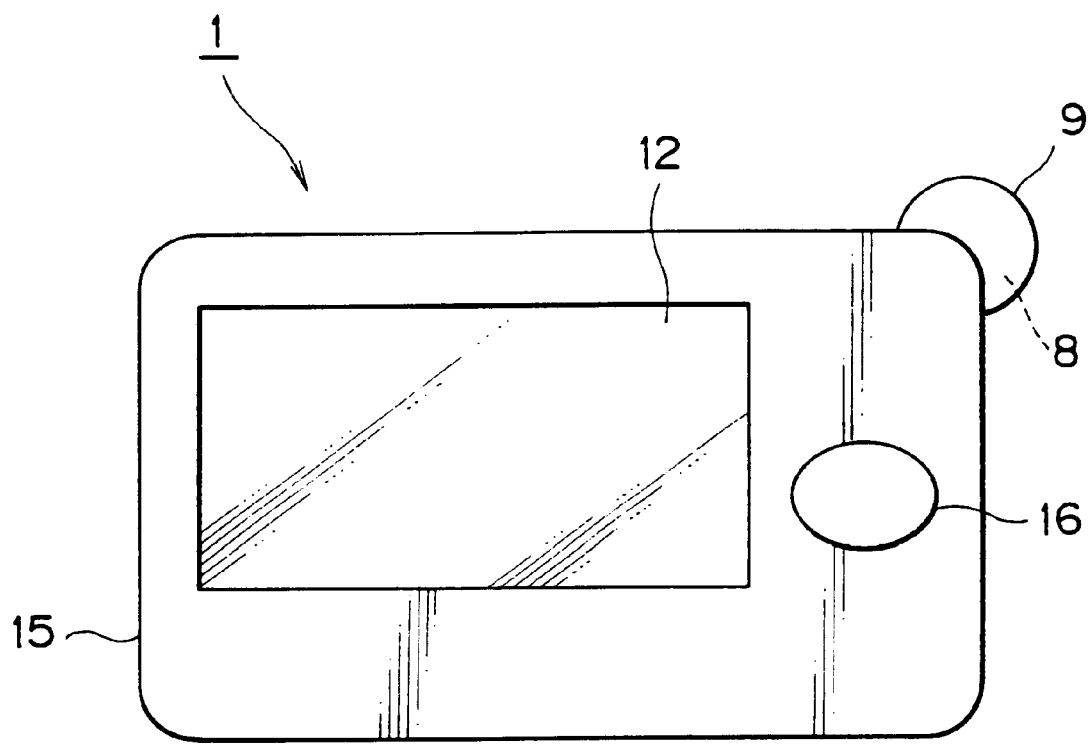
FIG. 5 is a diagram showing a front view of the external appearance of the portable radio information terminal shown in FIGS. 1 and 2.

FIG. 5 is a diagram showing a front view of the external appearance of the portable radio information terminal shown in FIGS. 1 and 2.

Used as a pager, the portable radio information terminal 1 provided by the present invention serves as a communication means which comprises an antenna 2, a receiver unit 3 and a demodulation unit 4 as shown in FIG. 2. The antenna 2 receives a radio wave conveying an information signal from a transmitter such as a radio base at a remote location. Connected to the antenna 2, the receiver unit 3 amplifies and detects the signal received by the antenna 2. Connected to the receiver unit 3, the demodulation unit 4 serves as a decoder for decoding a signal output by the receiver unit 3 to produce code information.

In addition, the modulation unit 4 also has an A/D converter for generating digital information. The modulation unit 4 further has a function to compare the code information obtained as a result of decoding with an ID code to form a judgment as to whether or not the received information signal is indeed a signal destined for this portable radio information terminal 1. The ID code is recorded in advance in an ID memory unit implemented typically by an EEPROM. It should be noted that the ID memory unit itself is not shown in the figure. A signal output by the demodulation unit 4 is supplied to a CPU 5.

The CPU 5 is further connected to a message storing memory unit 7 which is implemented typically by an SRAM.

The CPU 5 is a component for carrying out data processing and input/output processing. To put it in detail, the CPU 5 executes a variety of programs or executable procedures stored in advance in ROM units internal and external to the CPU 5 to read in an input signal received from an input device to be described later, to write data into a file on the message storing memory unit 7, to create or update a TOC (Table of Contents), to read out a file from the message storing memory unit 7 and to control all operations of the portable radio information terminal 1 including an operation to display information such as a message indicating existence of an incoming signal and warnings including an alarm indicating a voltage abnormality on a display screen.

A message included in the code information produced by the demodulation unit 4 from a received signal is written and stored in the message storing memory unit 7. The message is read out back from the message storing memory unit 7 to be displayed on a display screen. The message storing memory unit 7 can also be implemented by a non-volatile storage device such as a flash memory and an EEPROM in addition to the SRAM described above.

Operated by the user, the input device mentioned above comprises a rotary input device 9 and a press switch 8 forming a single assembly with the rotary input device 9. The single assembly comprising the press switch 8 and the rotary input device 9 constitutes a rotary/press input device 39 which will be described in detail later.

An input switch 16 is also provided as an input device operated by the user. The input switch 16 is a non-rotary input device which is actuated by a non-rotary operation. When a non-rotary operation such as a pressure or a touch is carried out on the input switch 16, an input signal 16a is generated. The input signal 16a generated by the input switch 16 is referred to as a non-rotary input signal. In this embodiment, the input switch 16 is used as an input device of a phase restoring operation to be described later.

The rotary input device 9, the press switch 8 and the input switch 16 are connected to an input-device control unit 10 which is connected to the CPU 5.

The CPU 5 is connected to a display-panel driving unit 11. Also connected to the display-panel driving unit 11 is a liquid-crystal display panel 12 as a displaying screen. The display-panel driving unit 11 and the liquid-crystal display panel 12 form an image displaying unit.

A display signal output by the CPU 5 is transmitted to the display-panel driving unit 11 which supplies a driving signal to the liquid-crystal display panel 12. Driven by the driving signal, the liquid-crystal display panel 12 forms a screen.

The CPU 5 is also connected to a message-signal outputting unit 13 which is connected to a speaker 14 used as an audio-message device. The CPU 5 outputs an operation signal to drive the speaker 14 by way of the message-signal outputting unit 13 for converting the operation signal into an audio signal for driving the speaker 14.

The CPU 5, the input-device control unit 10 and other components described above constitute a control means. Main components of the portable radio information terminal 1 shown in FIG. 1 are described as follows.

As shown in the figure, connected to a data bus serving as a data transfer means 20 are components such as the CPU 5, a system memory unit 6, a ROM unit 6', the message storing memory unit 7, an input-signal processing unit 10B, the display-panel driving unit 11 and the message-signal outputting unit 13.

Thus, the CPU 5 is capable of exchanging data with the system memory unit 6, the ROM unit 6', the message storing memory unit 7, the display-panel driving unit 11, the message-signal outputting unit 13 and the input-signal processing unit 10B through the data transfer means 20.

The system memory unit 6 is used for storing a variety of control procedures for controlling all operations of the portable radio information terminal 1 as programs executable by the CPU 5.

On the other hand, the ROM unit 6' is used for storing mainly a variety of execution procedures as programs executable by the CPU 5. The ROM unit 6' is implemented by a storage device such as a read-only MOS memory or a flash memory.

Figure 3:
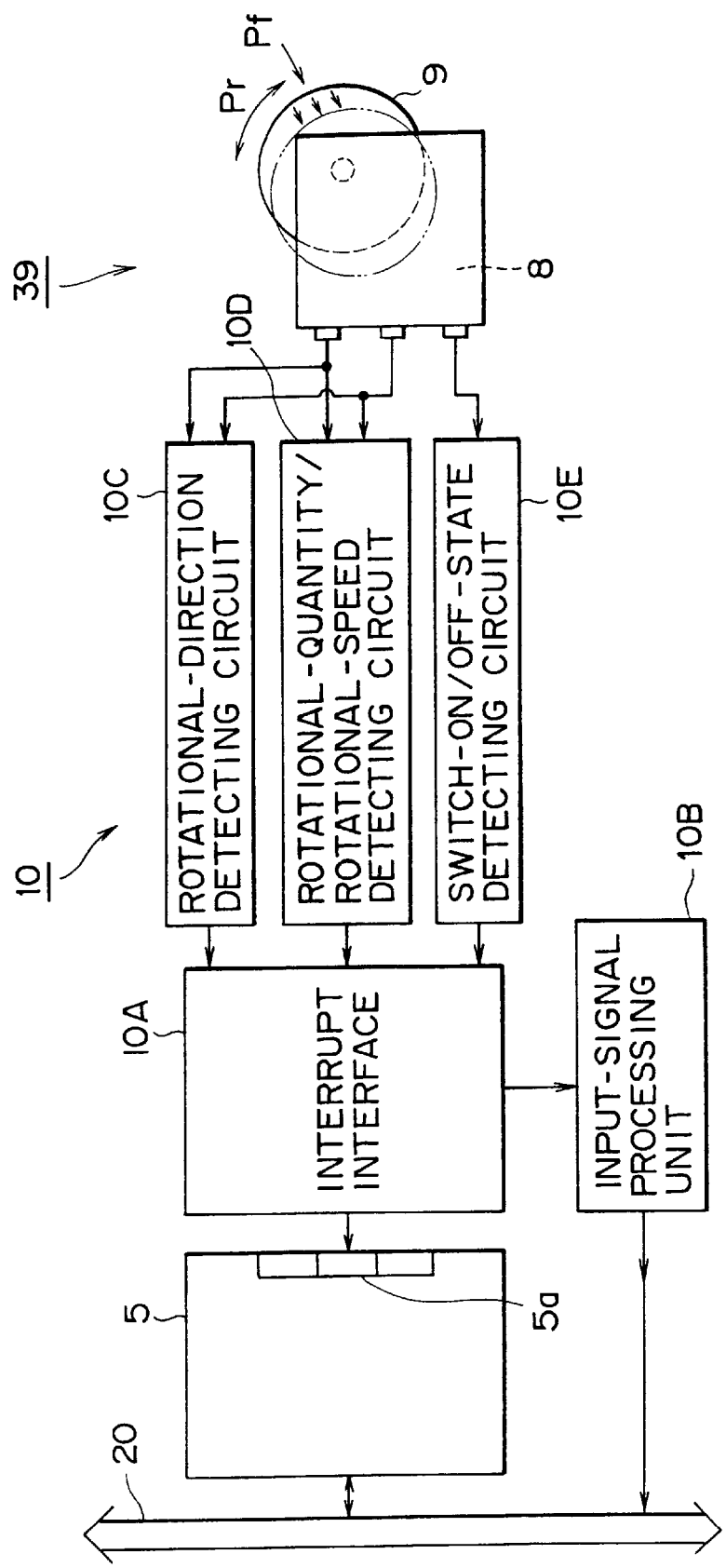
FIG. 3 is a diagram showing a typical configuration of a rotary/press input device employed in the portable radio information terminal provided by the present invention.

FIG. 3 is a diagram showing a typical configuration of the rotary/press input device 39. As shown in the figure, the rotary/press input device 39 provided by the embodiment includes a rotary input device 9 used as a rotary operation unit and a press switch 8 serving as a press operation unit which are built into a single assembly.

Such a rotary/press input device 39 allows the portable radio information terminal 1 to be made small in size and the number of components to be reduced. The rotary/press input device 39 is implemented typically by a jog dial or a rotary encoder. The rotary operation unit is provided with a disc-shaped knob which can be rotated with a high degree of freedom. The press operation unit generates an intermittent signal when pressed along with the disc-shaped knob.

Two groups of signal can be resulted in with ease when the disc-shaped knob is rotated in the clockwise (right) direction or the counterclockwise (left) direction respectively. Additionally, an intermittent input signal is generated by pressing the disc-shaped knob. Thus, the number of switch devices is reduced. As a result, the rotary/press input device 39 can be made small in size and the operatability thereof is improved.

The disc-shaped knob of the rotary input device 9 can be rotated in a direction indicated by an arrow Pr. When an input operation is carried out by rotating the rotary input device 9 in the clockwise or counterclockwise direction, a signal 9a dependent on the direction is generated. This signal is referred to as a rotary input signal 9a.

When the knob is pressed in a direction indicated by an arrow Pf, the press switch 8 makes a stroke. As a result, an intermittent signal 8a is generated. This intermittent signal 8a is referred to as intermittent input signal 8a.

Information on the rotational direction of the knob of the rotary input device 9 is detected by a rotational-direction detecting circuit 10C employed in the input-device control circuit 10 through a terminal as a signal which is then supplied to an interrupt interface unit 10A. The interrupt interface unit 10A in turn generates an interrupt signal based on the signal supplied thereto and forms a signal 10Aa shown in FIG. 1. The signal 10Aa conveying the information on the rotational direction is supplied to the input-signal processing unit 10B.

The input-signal processing unit 10B passes on the signal 10Aa to the data transfer means 20 immediately as it is or after holding the signal 10Aa.

The information is used in execution of a means for determining the rotational direction of the rotary device. It should be noted that this means is stored in the system memory unit 6, being shown in none of the figures.

In the case of an input-signal processing unit 10B that outputs the signal 10Aa immediately without holding it, the information on the rotational direction of the knob is used only once. That is to say, an operation carried out on the knob corresponds to one execution of processing.

In the case of an input-signal processing unit 10B that outputs the signal 10Aa after holding it, on the other hand, the information on the rotational direction of the knob can be used repeatedly. That is to say, with the knob put in a state of being rotated continuously, processing is carried out repetitively.

In addition, information on the rotational quantity and the rotational speed of the knob of the rotary input device 9 is supplied to a rotational-quantity/rotational-speed detecting circuit 10D employed in the input-device control circuit 10 through a terminal as a signal which is then similarly supplied to the interrupt interface unit 10A as shown in FIG. 3. The information is used in processing carried out thereafter.

As shown in FIG. 3, an intermittent input signal 8a generated by the press switch 8 is supplied to a switch-on/off-state detecting circuit 10E employed in the input-device control circuit 10 through a terminal as a signal which is then likewise supplied to the interrupt interface unit 10A.

In addition, the rotary input device 9 and the press switch 8 are designed so that they can be operated independently of each other. They can also be operated simultaneously as well.

The rotary input device 9 employed in the rotary/press input device 39 described above functions as an input device operated by the user for supplying a command signal for controlling operations in general including a change command signal to change a number displayed on the screen and a select signal to specify a specific portion on the screen. On the other hand, the press switch 8 employed in the rotary/press input device 39 described above functions as an input device operated by the user for supplying a signal used mainly for confirming a selected portion or a displayed number and typically for causing the operation of the portable radio information terminal 1 to transit from are phase to another.

The rotary input signal 9a, the intermittent input signal 8a and the non-rotary input signal 16a generated by the rotary input device 9, the press switch 8 and the input switch 16 respectively are each converted by the interrupt interface unit 10A into an interrupt signal supplied to the CPU 5 by way of an interrupt receiving terminal.

When the rotary input signal 9a, the intermittent input signal 8a or the non-rotary input signal 16a is generated as a result of an operation carried out on the rotary input device 9, the press switch 8 or the input switch 16 respectively, an interrupt signal is supplied by the interrupt interface unit 10A to the CPU 5, causing the CPU 5 to change to an interrupt processing phase.

Figure 4:
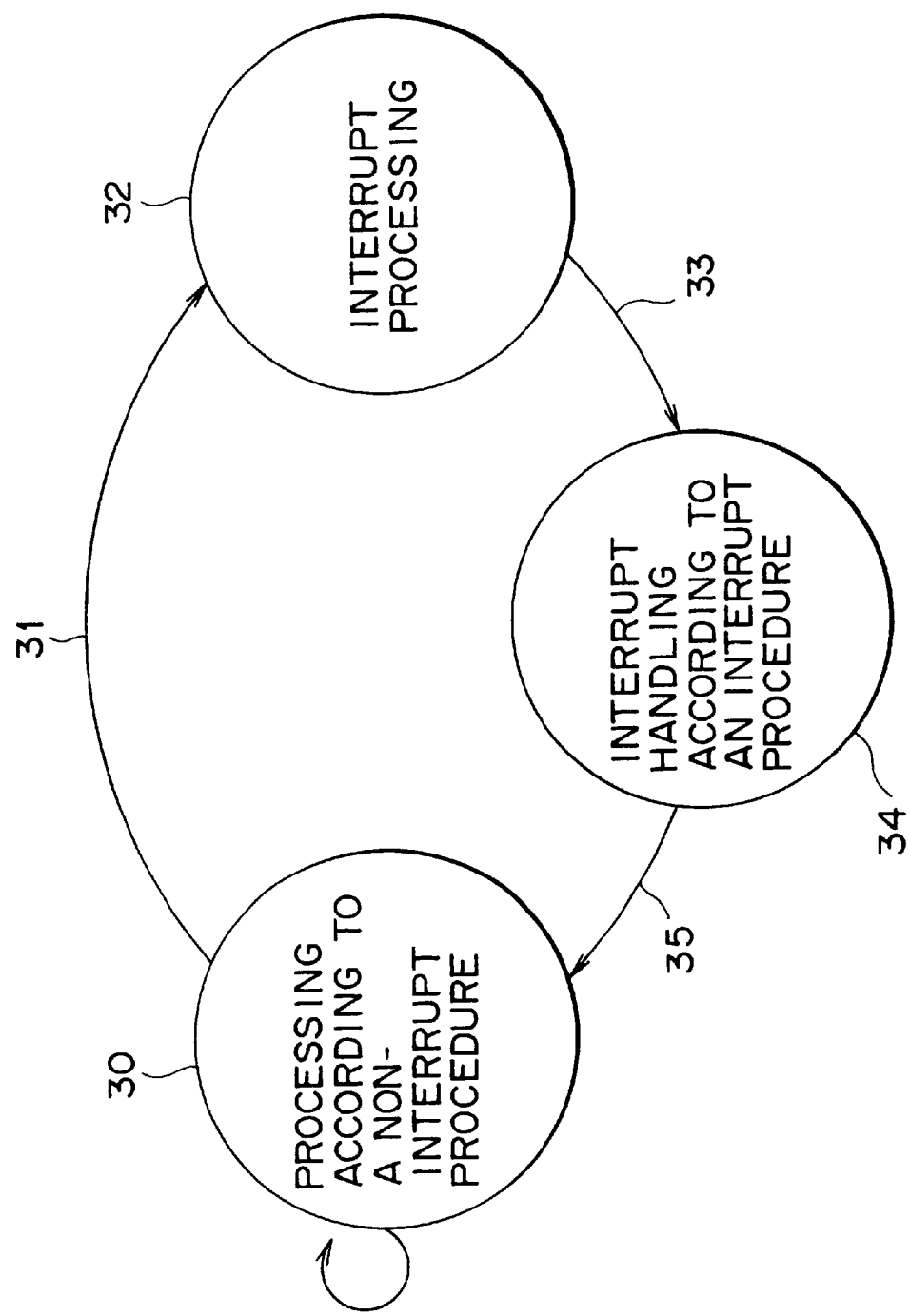
FIG. 4 is a state-transition diagram showing a process for changing to an interrupt handling procedure in the event of an interrupt generated by the input device.

FIG. 4 is a state-transition diagram showing a process for changing to an interrupt handling procedure in the event of an interrupt generated by the input device. The process begins with a state of processing 30 according to a non-interrupt procedure. In the event of an interrupt signal generated in this state 30, a state of the interrupt generation 31 is detected by the CPU 5 and the portable radio information terminal 1 changes a state of processing the interrupt signal 32. In this state 32, an interrupt signal is processed in accordance with an interrupt-signal processing procedure stored in the system memory unit 6. This procedure begins with identification of an input device that has generated the interrupt signal. An input device generating the interrupt signal can be identified directly from an interrupt receiving terminal that receives the interrupt signal or from information conveyed by the input signal 10Aa supplied by the interrupt interface unit 10A to the input-signal processing unit 10B.

After an input device generating the interrupt signal has been identified as described above, that is, after an input device operated by the user has been identified, a transition state 33 shown in FIG. 4 occurs from the interrupt-signal processing state 32 to an interrupt handling state 34. In the state 34, an interrupt handling procedure associated with the identified input device is read out from the system memory unit 6 to be followed in execution of processing to handle the interrupt. Normally, data such as a value entered by the user via the identified input device is confirmed in this processing. At the end of this processing, a transition 35 occurs from the state 34 to the state 30 in which the CPU 5 resumes the non-interrupt processing which was interrupted by the occurrence of the interrupt 31. In this resumed processing, the data entered via the interrupting input device can be used.

Next, a variety of means stored in the ROM unit 6' are explained by referring to FIG. 1.

As shown in the figure, a transition-request-input detecting means 26, an inter-phase transition means 27 and a phase-processing executing means 28 are each stored in the ROM unit 6' as a program, that is, a procedure executable by the CPU 5.

The transition-request-input detecting means 26 detects an input signal that is generated by an input device while the portable radio information terminal 1 is operating at one of a plurality of phases to make a request for an inter-phase transition to another phase.

The inter-phase transition means 27 suspends processing carried out at the current phase, performing an operation to change from the current phase to another phase in accordance with a detection result produced by the transition-request-input detecting means 26.

The phase-processing executing means 28 operates at least to call a screen and display the called screen at another phase set after an inter-transition made by the inter-phase transition means 27.

Any program format can be used for prescribing the means described above as long as the program can be executed directly or indirectly. It is thus desirable to adopt an absolute-binary addressing format, and a relocatable-binary format which needs readdressing at execution time is also acceptable. In the case of the latter format, however, it is necessary to keep a linkage means in the system memory unit 6 as a resident tool.

FIG. 5 is a diagram showing a front view of the external configuration of the portable radio information terminal 1 implemented by the embodiment. The configuration of the portable radio information terminal 1 implemented by the embodiment is;explained by referring to this figure as follows.

The portable radio information terminal 1 implemented by the embodiment is accommodated in a thin hexahedron cabinet 15. At about the center of the front face of the cabinet 15, there is provided a liquid-crystal display panel 12 for displaying a message, a date and/or the time of the day.

At the upper right corner of the cabinet 15, a jog dial used as the rotary/press input device 39 described earlier is installed in such a way that a portion of the jog dial protrudes outward from the cabinet 15 to the external side. The rotary/press input device 39 has a knob serving as the rotary input device 9 which can be rotated in the clockwise and counterclockwise directions with a high degree of freedom.

A press switch 8 is assembled with the rotary input device 9 as a single assembly. When the knob of the rotary input device 9 is pressed, the press switch 8 is actuated.

At a position on the lower side adjacent to the liquid-crystal display panel 12, the input switch 16 functioning as an escape key is embedded in such a way that the input switch 16 can be pressed and operated with ease. The input switch 16 is operated by the user to enter a command to escape or to return to a specific screen, a message halting command to stop alarming sound generated as a message indicating an incoming call or a command to control an operation.

The input switch 16 is slightly dented on the surface of the cabinet 15 toward the inner side of the cabinet 15 to form such a structure that an inadvertent external force will not be applied to the switch 16 accidentally. With such a structure, a malfunction can be avoided.

On the liquid-crystal display panel 12, it is possible to display a message text composed of up to typically 4 lines each comprising a maximum of typically 20 alphabetical and numerical characters.

The configuration of the portable radio information terminal 1 implemented by the embodiment has been described so far. Next, the operation of the portable radio information terminal 1 is explained as follows.

First of all, normal operations to receive a radio signal and to display a message are discussed by referring mainly to FIG. 2.

When an electric wave conveying information or a message destined for a specific portable radio information terminal 1 is transmitted from a radio transmitting station, the terminal 1 receives the radio wave using the antenna 2. In the receiver unit 3, the radio wave is subjected to signal processing such as conversion into a signal having an intermediate frequency, amplification and detection. In the demodulation unit 4, after the fact that the message is indeed destined for the portable radio information terminal 1 has been confirmed, the received information signal is decoded. The decoded information signal is finally stored in the message storing memory unit 7 in an operation controlled by the CPU 5.

To put it in detail, a message file is created for each message text. A message text is written into a message file which is stored in the message storing memory unit 7.

A plurality of message files containing message texts of the same type are collected into a folder. Message files are stored in the message storing memory unit 7 in folder units.

The CPU 5 controls the operation of the portable radio information terminal 1 by execution of control programs stored in the system memory unit 6. First of all, the CPU 5 forms a judgment as to whether or not an information signal has been received:. If an information signal is judged to have been received, the display-panel driving unit 11 is operated to display a message of the received information signal read out from the message storing memory unit 7 on the liquid-crystal display panel 12 as a text composed of up to typically 4 lines each comprising a maximum of typically 20 alphabetical and numerical characters.

It should be noted that the image displaying unit does not have to be implemented by the liquid-crystal display panel 12. An image displaying unit of any arbitrary type can be employed. In addition, the configuration of a screen is not limited to a configuration composed of up to 4 lines each comprising a maximum of 20 alphabetical and numerical characters. Any arbitrary screen configuration is applicable.

In addition, when an information signal is judged to have been received, the CPU 5 issues a command to operate the message-signal outputting unit 13. Operated by the command, the message-signal outputting unit 13 supplies an alarm signal to the speaker 14 to generate sound for making the user aware of the fact that an information signal has been received.

Figure 6:
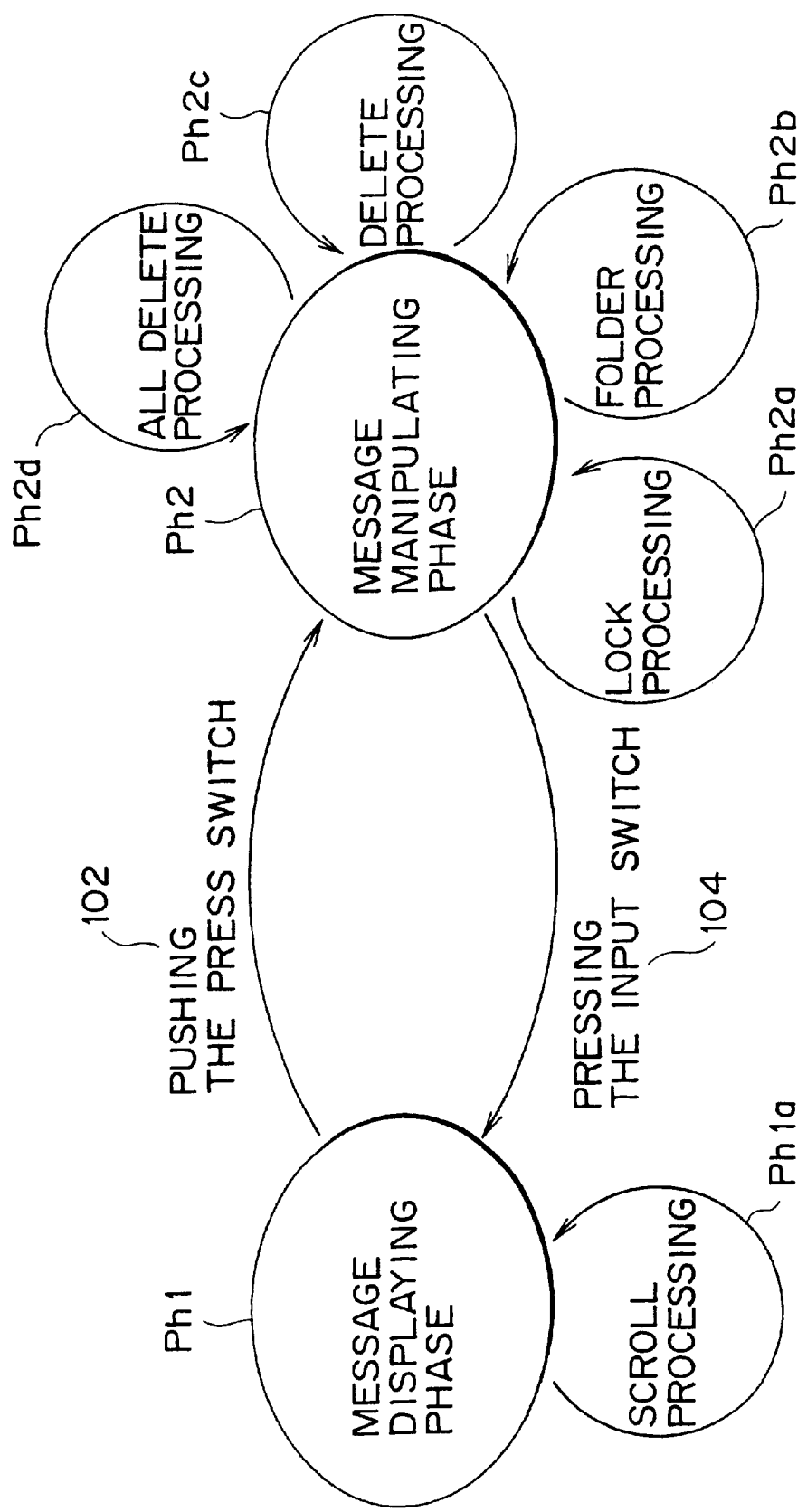
FIG. 6 is an explanatory diagram showing phase transitions occurring in the portable radio information terminal provided by the present invention.
Figure 7:
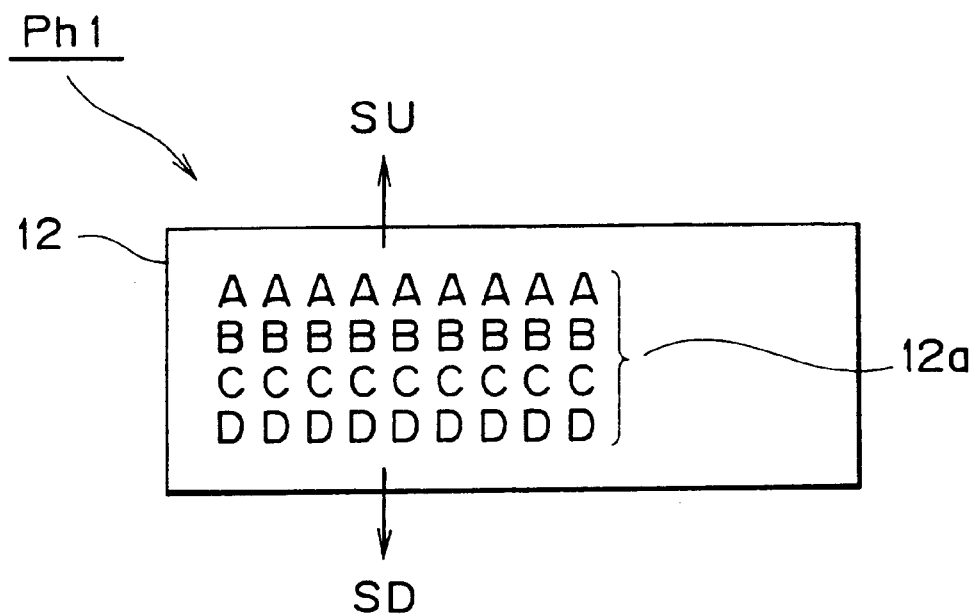
FIG. 7 is a model diagram showing a message displaying screen at a message displaying phase.

FIG. 6 is an explanatory diagram showing phase transitions occurring in the portable radio information terminal 1 implemented by the embodiment. FIG. 7 is a model diagram showing a message displaying screen at a message displaying phase and FIG. 8 is a model diagram showing a message manipulating screen at a message manipulating phase.

Figure 8:
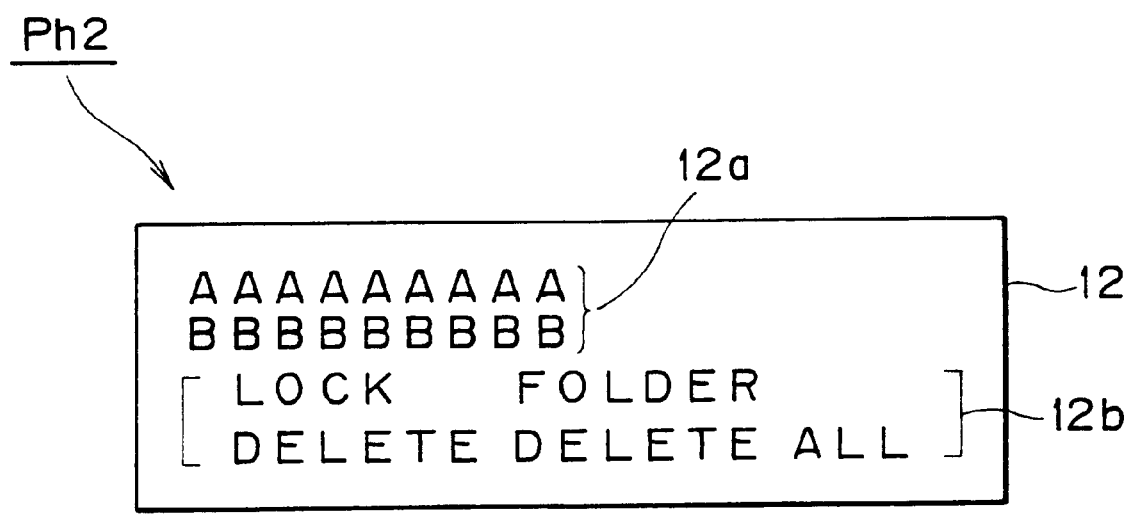
FIG. 8 is a model diagram showing a message manipulating screen at a message manipulating phase.

The configuration of the phase transitions occurring in the portable radio information terminal 1 is explained by referring to FIGS. 6 to 8. To make the explanation easy to understand, one of the phases is referred to as a message displaying phase and the other phase is referred to as a message manipulating phase.

Assume that the message displaying phase Ph1 shown in FIG. 6 is the current phase at which the portable radio information terminal 1 is operating. In this case, a message text 12a like the one shown in FIG. 7 is displayed on a screen 12.

If a request to scroll the screen 12 is made in this state, scroll processing Ph1a is carried out at the message displaying phase Ph1 with the portable radio information terminal 1 remaining at the message displaying phase Ph1 as it is.

To put it concretely, if the rotary input device 9 employed in the rotary/press input device 39 is rotated in the counterclockwise direction, scroll processing SU in the upward direction shown in FIG. 7 is carried out. If the rotary input device 9 employed in the rotary/press input device 39 is rotated in the clockwise direction, on the other hand, scroll processing SD in the downward direction shown in FIG. 7 is carried out.

If a request for an inter-phase transition is made by the user by an operation 102 to press the press switch 8 employed in the rotary/press input device 39, the state of the portable radio information terminal 1 changes from the current message displaying phase Ph1 to the message manipulating phase Ph2. The current phase is now the message manipulating phase Ph2 at which the portable radio information terminal 1 is operating.

At the message manipulating phase Ph2, a message manipulating screen 12b like the one shown in FIG. 8 is displayed on the screen 12. It should be noted that, on the message manipulating screen 12b shown in FIG. 8, a portion of the message on the screen displayed at the immediately preceding message displaying phase Ph1 remains.

The message manipulating screen 12b displays a plurality of functions, namely, LOCK, FOLDER, DELETE and DELETE ALL used to manipulate the message displayed at the immediately preceding message displaying phase Ph1. The LOCK function is used to inhibit deletion of the message displayed at the immediately preceding message displaying phase Ph1. If the LOCK function is selected, processing Ph2a to lock the message displayed at the immediately preceding message displaying phase Ph1 is carried out at this message manipulating phase Ph2 with the portable radio information terminal 1 remaining at the message manipulating phase Ph2. After the lock processing Ph2a is finished, the portable radio information terminal 1 remains at the message manipulating phase Ph2.

The FOLDER function is used to change the current folder to another folder or to transfer the message displayed at the immediately preceding message displaying phase Ph1 from its received-message storing area to another area. If the FOLDER function is selected, this folder processing Ph2b is carried out at this message manipulating phase Ph2 with the portable radio information terminal 1 remaining at the message manipulating phase Ph2 as it is. After the folder processing Ph2b is finished, the portable radio information terminal 1 remains at the message manipulating phase Ph2.

The DELETE function is used to delete the message. If the DELETE function is selected, processing Ph2c to delete the message displayed at the immediately preceding message displaying phase Ph1 is carried out at this message manipulating phase Ph2 with the portable radio information terminal 1 remaining at the message manipulating phase Ph2. After the processing Ph2c to delete the message is finished, the portable radio information terminal 1 remains at the message manipulating phase Ph2.

The DELETE ALL function is used to delete all messages stored in the current folder except locked ones. If the DELETE ALL function is selected, processing Ph2d to delete all the messages is carried out at this message manipulating phase Ph2 with the portable radio information terminal 1 remaining at the message manipulating phase Ph2. After the processing Ph2d to delete all messages is finished, the portable radio information terminal 1 remains at the message manipulating phase Ph2.

If an operation 104 to press the input switch 16 functioning as an escape key is carried out at the message manipulating phase Ph2, the portable radio information terminal 1 makes a transition from the message manipulating phase Ph2 back to the message displaying phase Ph1, restoring the message displaying phase Ph1.

FIG. 9 shows a flowchart representing the phase transitions taking place in the portable radio information terminal implemented by the first embodiment of the present invention and operations to call and display a screen.

The phase transitions and the operations to call and display a screen are described by referring to FIGS. 9 and 6 as follows.

As shown in FIG. 9, the flowchart begins with a step S1 at which the message displaying phase Ph1 is started to let the portable radio information terminal currently operate at the phase Ph1.

The flow then goes on to a step S2 at which the transition-request-input detecting means 26 detects an input signal generated by the rotary/press input device 39 at the message displaying phase Ph1.

If the input signal is a signal generated by the rotary input device 9 employed in the rotary/press input device 39 serving as a scroll switch, the flow proceeds to a step S3 at which the scroll processing Ph1a is carried out. The flow then goes back to the step S2.

If the input signal detected at the step S2 is a press signal 102 generated by the press switch 8 employed in the rotary/press input device 39, the transition-request-input detecting means 26 recognizes the press signal as a signal requesting an inter-phase transition, issuing a command to the inter-phase transition means 27.

Then, the flow continues to a step S4 at which the inter-phase transition means 27 suspends the operation currently being carried out at the message displaying phase Ph1, executing a transition to the message manipulating phase Ph2 in accordance with the command received from the transition-request-input detecting means 26.

When the transition to the message manipulating phase Ph2 is finished, the phase-processing executing means 28 operates, displaying a message manipulating screen.

The flow then goes on to a step S5 at which the phase-processing executing means 28 forms a judgment as to whether or not an input signal has been generated by the input switch 16 at the message manipulating phase Ph2.

If an input signal has not been generated by the input switch 16, the flow proceeds to a step S6 to detect an input signal from the rotary input device 9 and the press switch 8 employed in the rotary/press input device 39 as follows.

For example, if one of the LOCK, FOLDER, DELETE and DELETE ALL functions displayed on the message manipulating screen shown in FIG. 8 is selected by an operation carried out on the rotary input device 9 employed in the rotary/press input device 39 and further confirmed by an operation carried out on the press switch 8 employed in the rotary/press input device 39, an input signal is generated by the press switch 8.

If the input signal generated by the press switch 8 indicates that the LOCK function has been selected, the flow continues to a step S7 at which the phase-processing executing means 28 carries out the lock processing Ph2a to lock the file of a message displayed at the message displaying phase Ph1. The flow then goes back to the step S5.

If the input signal generated by the press switch 8 indicates that the FOLDER function has been selected, the flow continues to a step S8 at which the phase-processing executing means 28 carries out the processing Ph2b to move for the file of a message displayed at the message displaying phase Ph1 to the folder. The flow then goes back to the step S5.

If the input signal generated by the press switch 8 indicates that the DELETE function has been selected, the flow continues to a step S9 at which the phase-processing executing means 28 carries out the processing Ph2c to delete the file of a message displayed at the message displaying phase Ph1. The flow then goes back to the step S5.

If the input signal generated by the press switch 8 indicates that the DELETE ALL function has been selected, the flow continues to a step S10 at which the phase-processing executing means 28 carries out the processing Ph2d to delete all message files except locked ones. The flow then goes back to the step S5.

If the outcome of the judgment formed at the step S5 indicates that an input signal has been generated by the input switch 16, on the other hand, the phase-processing executing means 28 hands over control to the transition-request-input detecting means 26.

Receiving the control, the transition-request-input detecting means 26 judges a press operation 104 to have been carried out on the input switch 16, issuing a command to the inter-phase transition means 27.

Then, the flow continues to a step S11 at which the inter-phase transition means 27 discontinues the operation being carried out at the message manipulating phase Ph2, executing a transition from the message manipulating phase Ph2 to the message displaying phase Ph1 in accordance with the command received from the transition-request-input detecting means 26.

The operation that has been suspended before is resumed at this message displaying phase Ph1.

In this way, when the user deems that it is necessary to lock a long message text while the user is reading this message displayed at the message displaying phase Ph1, for example, a transition from the message displaying phase Ph1 to the message manipulating phase Ph2 can be executed right away even in the course of reading the message by merely pressing the press switch 8. At the message manipulating phase Ph2, the message text displayed at the message displaying phase Ph1 is locked.

In addition, a transition back from the message manipulating phase Ph2 to the message displaying phase Ph1 can be made right away by merely pressing the input switch 16 which serves as an escape key as soon as the lock processing is finished. At the message displaying phase Ph1, the operation to display the same message is resumed starting from a position at which the operation has been suspended, requiring no scroll operation to find the position of suspension at all and, hence, allowing the user to continue reading the message right away without doing any operation.

As described above, the embodiment substantially improves the way of operating the portable radio information terminal as the user likes. With the conventional configuration, it is feared that incorrect processing is inadvertently carried out due to complicated operations. For example, an important message is deleted by mistake in spite of the fact that the user intends to lock the message. In the case of the portable radio information terminal provided by the present invention, however, it is possible to prevent a message text from being deleted inadvertently because no complicated operation is required. As a result, higher reliability can be obtained.

In a portable radio information terminal implemented by a second embodiment of the present invention, the transition-request-input detecting means 26 is capable of detecting an input signal generated by an input device to request an inter-phase transition in the course of an operation carried out at either the message displaying phase or the message manipulating phase.

In addition, the inter-phase transition means 27 is capable of suspending an operation currently being carried out at either one of the message displaying phase or the message manipulating phase, and executing a transition to the other phase in accordance with a result of detection output by the transition-request-input detecting means 26.

Furthermore, the phase-processing executing means 28 is capable of at least calling and displaying a screen of the message displaying phase upon transition from the message manipulating phase to the message displaying phase or a screen of the message manipulating phase upon transition from the message displaying phase to the message manipulating phase.

Since the remaining parts are the same as the portable radio information terminal implemented by the first embodiment, their explanation is omitted.

Figure 10:
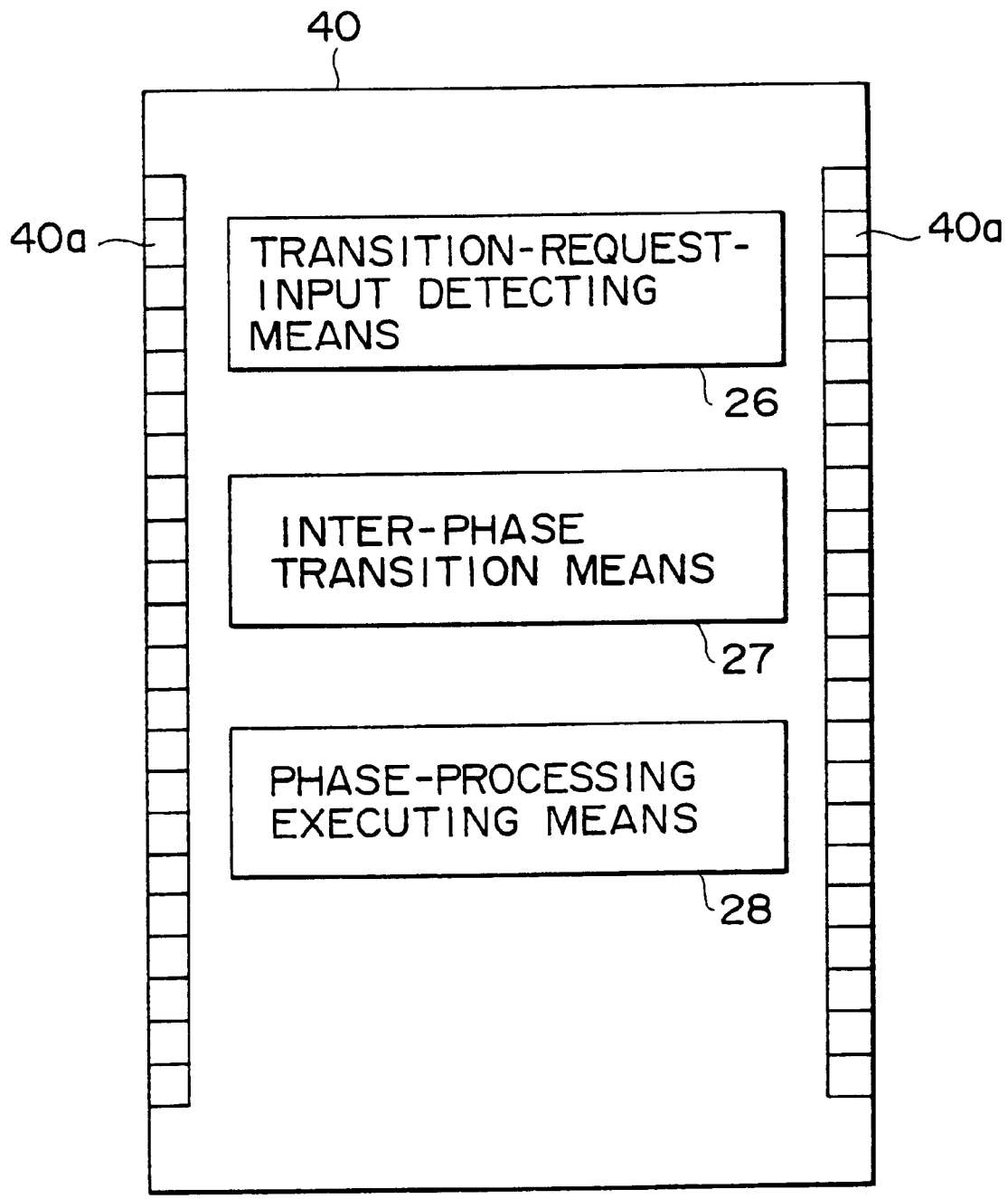
FIG. 10 is an explanatory diagram showing the configuration of a recording medium implemented by a third embodiment of the present invention.

FIG. 10 is an explanatory diagram showing the configuration of a recording medium implemented by a third embodiment of the present invention. The recording medium implemented by the third embodiment of the present invention is explained by referring to this figure as follows.

The recording medium 40 implemented by the third embodiment of the present invention is a single-chip semiconductor memory which includes at least the three means described below. The three means each includes a procedure, that is, a program which can be executed by a computer. The three means can be accessed through chip pins 40a.

The first means is the transition-request-input detecting means 26 which is read out and executed by a central processing unit employed in the computer to detect an input signal generated by an input device in the course of an operation carried out at any one of a plurality of phases to request an inter-phase transition.

The second means is the inter-phase transition means 27 which is read out and executed by the central processing unit employed in the computer to suspend an operation carried out at the current phase and execute a transition to another phase determined by a result of detection output by the transition-request-input detecting means 26.

The third means is the phase-processing executing means 28 which is read out and executed by the central processing unit employed in the computer to at least call and display a screen of a phase to which an inter-phase transition has been executed by the inter-phase transition means 27.

As described above, the recording medium 40 is incorporated in the portable radio information terminal having the computer including the central processing unit, an input device, an image displaying unit and a message storing memory unit as a memory for storing operating procedures to be executed by the central processing unit. By letting the central processing unit sequentially execute the three means which are each stored in the recording medium 40 as a procedure, it is possible to implement a portable radio information terminal having the functions to detect an input signal requesting an inter-phase transition, execute the transition to another phase indicated by the result of detection and to at least call and display a screen at the other phase.

The recording medium 40 provided by this embodiment can be applied to mainly a flash memory. In addition, the recording medium can be applied to a read-only MOS memory, an SRAM, an EPROM, an EEPROM and the other so-called non-volatile semiconductor recording mediums.

In addition, the recording medium 40 can also be applied to an optical recording medium, an optical magnetic recording medium and a magnetic recording medium as well.

Figure 11:
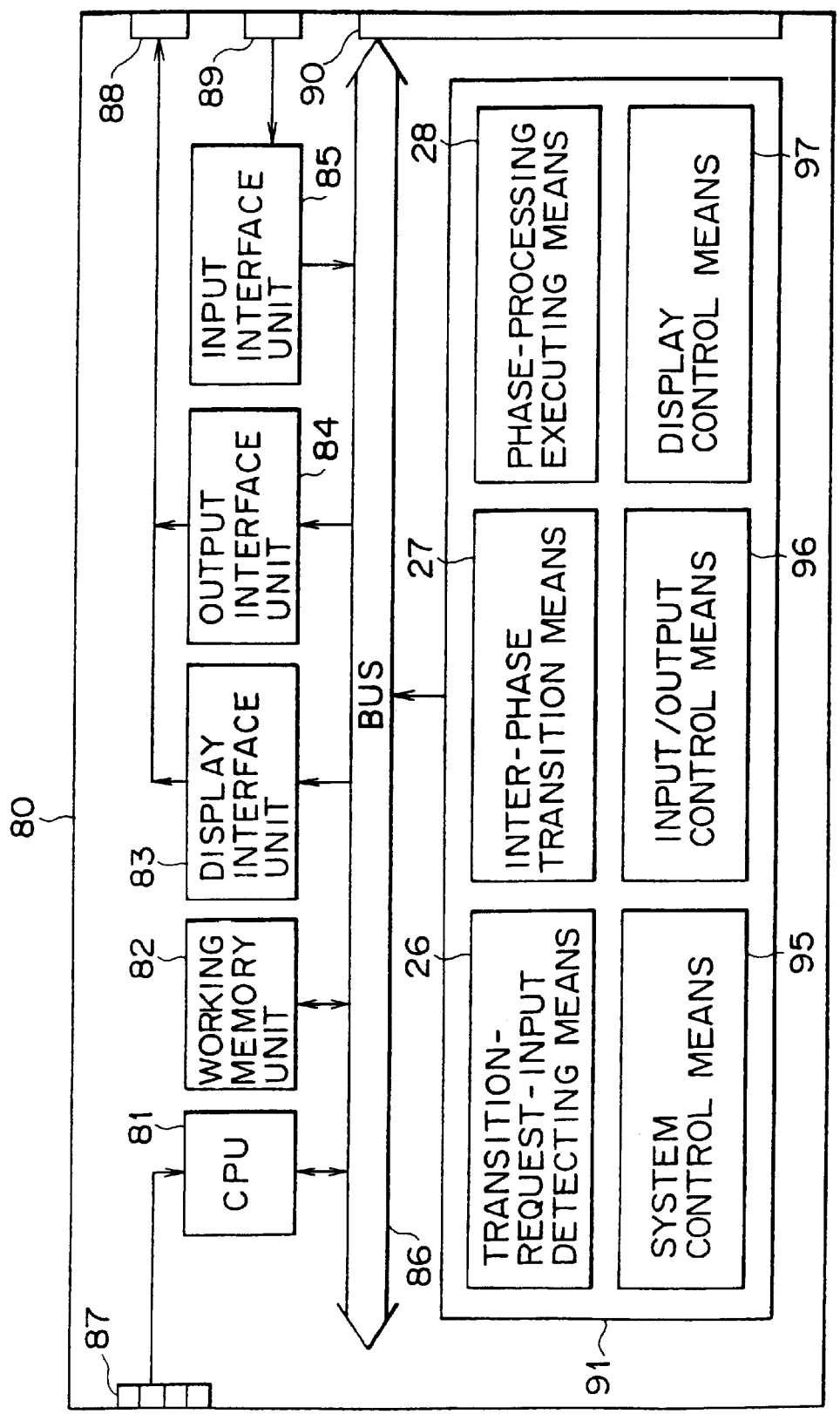
FIG. 11 is a block diagram showing the configuration of a microcomputer implemented by a fourth embodiment of the present invention.

FIG. 11 is a block diagram showing the configuration of a microcomputer implemented by a fourth embodiment of the present invention. The microcomputer implemented by the fourth embodiment of the present invention is explained by referring to FIG. 11.

Designed into a one-chip product, the microcomputer 80 implemented by the fourth embodiment of the present invention comprises a CPU (central processing unit) 81, a working memory unit 82, a display interface unit 83, an output interface unit 84, an input interface unit 85 and a memory unit 91 which are connected to each other by an internal bus 86 as shown in the figure.

External pins provided on the chip of the microcomputer 80 are interrupt input pins 87 connected to an interrupt input terminal of the CPU 81, output pins 88 connected to the display interface unit 83 and the output interface unit 84, input pins 89 connected to the input interface unit 85 and common bus pins 90 connected to the internal bus 86.

The memory unit 91 is used for storing programs that can be executed by the CPU 81. The programs include a system control means 95, an input/output control means 96, a display control means 97, the transition-request-input detecting means 26, the inter-phase transition means 27 and the phase-processing executing means 28.

The system control means 95 is executed to control not only operations of the components inside the chip of the microcomputer 80 but also operations of the whole portable radio information terminal including the microcomputer 80 itself and operations of components in the portable radio information terminal other than the microcomputer 80. The procedure implementing this system control means is adapted to the portable radio information terminal provided by the present invention.

By the same token, the input/output control means 96 is executed to control not only exchanges of data and signals among the components inside the chip of the microcomputer 80 but also exchanges of data and signals between the whole portable radio information terminal including the microcomputer 80 itself as well as components in the portable radio information terminal other than the microcomputer 80 and the external world. The procedure implementing this system control means is adapted to the portable radio information terminal 1 provided by the present invention.

On the other hand, the display control means 97 is executed to control operations to display a message text on a screen on an image displaying unit connected externally to the microcomputer 80.

The transition-request-input detecting means 26 is read out and executed by the central processing unit 81 to detect an input signal generated by an input device in the course of an operation carried out at any one of a plurality of phases to request an inter-phase transition.

The inter-phase transition means 27 is read out and executed by the central processing unit 81 to suspend an operation carried out at the current phase and execute a transition to another phase determined by a result of detection output by the transition-request-input detecting means 26.

The phase-processing executing means 28 is read out and executed by the central processing unit 81 to at least call and display a screen of a phase to which a transition has been executed by the inter-phase transition means 27.

By incorporating the microcomputer 80 in a portable radio information terminal equipped with components including a communication mechanism unit, a memory unit for recording a received message, an input device such as a rotary/press input device used for entering an input command, a message device, an image displaying unit for displaying information such as a message and a power-supply circuit, it is possible to easily provide a portable radio information terminal with the functions to detect an input signal requesting an inter-phase transition, execute the transition to another phase indicated by the result of detection and to at least call and display a screen at the other phase.

What is claimed is:

1. A screen displaying method for a portable radio information terminal, comprising the steps of:

storing an incoming message in a message file;

fetching said stored message from said message file;

displaying, by an image display unit, at least a portion of said fetched message on a screen having a single display portion at a message displaying phase;

inputting, by a first input device, a command for controlling an operation;

suspending an operation carried out within said message displaying phase when said input command is generated by said first input device during said operation;

executing a transition from said message displaying phase to a message manipulating phase;

calling and displaying an image corresponding to said message manipulating phase, wherein a portion of said fetched message at said message displaying phase and a plurality of functions of said message manipulating phase are simultaneously displayed by said image display unit; and said plurality of functions includes at least lock folder, delete, and delete all functions;

selecting, by said first input device, one of said plurality of functions of said message manipulating phase; and returning, by a second input device, from said message manipulating phase to said message displaying phase.

2. The screen displaying method according to claim 1, further comprising the steps of:

reading out, during said message displaying phase, said message from said message file;

displaying, during said message displaying phase, said message on said screen on said image displaying unit; and manipulating said message file during said message manipulating phase.

3. A portable radio information terminal, comprising:

a storage device for storing an incoming message in a message file, a fetching device for fetching said stored message from said message file, and an image displaying unit for displaying at least a portion of said fetched message on a screen having a single display portion at a message displaying phase;

a first input device for at least inputting a command for controlling an operation;

a central processing unit; and a ROM unit for storing a plurality of execution procedures as programs executable by said central processing unit, said ROM unit including:

transition-request-input detecting means for detecting an input signal generated by said first input device during an operation carried out at said message displaying phase for requesting an inter-phase transition;

inter-phase transition means for suspending said operation carried out at said message displaying phase and for executing an inter-phase transition from said message displaying phase to a message manipulation phase determined by a detection output result from said transition-request-input detecting means; and phase-processing executing means for at least calling and displaying an image corresponding to said message manipulation phase resulting from said inter-phase transition executed by said inter-phase transition means on said image displaying unit, wherein a portion of said fetched message at said message displaying phase and a plurality of functions of said message manipulating functions are simultaneously displayed by said image displaying unit;

said plurality of functions includes at least lock, folder, delete, and delete all functions; and one of said plurality of functions of said message manipulating phase is selected by said first input device; and a second input device for returning from said message manipulating phase to said message displaying phase.

4. A recording medium for storing programs fetchable and executable by a computer employed in a portable radio information terminal provided with an image displaying unit having a screen with a single display portion and a first input device for controlling an operation, said programs comprising:

transition-request-input detecting means for detecting an input signal generated by said first input device during an operation carried out at a message displaying phase for requesting an inter-phase transition;

inter-phase transition means for suspending said operation carried out at said message displaying phase and for executing an inter-phase transition from said message displaying phase to a message manipulation phase determined by a detection output result from said transition-request-input detecting means; and phase-processing executing means for at least calling and displaying an image corresponding to said message manipulation phase resulting from said inter-phase transition executed by said inter-phase transition means on said image displaying unit, wherein a portion of a message from said message displaying phase and a plurality of functions of said message manipulating phase are simultaneously displayed on said image displaying unit, wherein said plurality of functions includes at least lock, folder, delete, and delete all functions; and one of said plurality of functions of said message manipulating phase is selected by said first input device; and a second input device for returning from said message manipulating phase to said message displaying phase.

5. An information processing apparatus, comprising:

an embedded central processing unit;

an embedded storage unit for storing programs as procedures, said procedures being fetched and executed by said central processing unit; and embedded data transfer means connectable to external equipment and used for connecting at least said central processing unit to said storage unit, wherein said information processing apparatus transmits a signal based on a processing result output by said central processing unit to said external equipment by one of radio communication and wire communication;

said information processing apparatus is employed in a portable radio information terminal including an image displaying unit having a screen with a single display portion and a first input device; said programs stored in said storage unit at least include:

transition-request-input detecting means for detecting an input signal generated by said first input device during an operation carried out at a message displaying phase for requesting an inter-phase transition;

inter-phase transition means for suspending said operation carried out at said message displaying phase and for executing an inter-phase transition from said message displaying phase to a message manipulation phase determined by detection output result from said transition-request-input detecting means; and phase-processing executing means for at least calling and displaying an image corresponding to a plurality of functions of said message manipulating phase resulting from said inter-phase transition executed by said inter-phase transition means on said image displaying unit, wherein a portion of a message from said message displaying phase and said one of said message manipulating functions are simultaneously displayed on said image displaying unit.

* * * * *